United States Patent [19]

Vizziello et al.

[11] 3,865,161
[45] Feb. 11, 1975

[54] GROOVING MACHINE

[75] Inventors: Vito M. Vizziello, Hamden, Conn.; Charles A. Bouteiller, Great Barrington, Mass.

[73] Assignee: New England Log Homes, Inc., New Haven, Conn.

[22] Filed: May 9, 1973

[21] Appl. No.: 358,680

[52] U.S. Cl.............. 144/136 R, 83/471.2, 83/478, 83/485, 144/134 R
[51] Int. Cl.............................................. B27c 5/02
[58] Field of Search......... 83/5, 488, 478, 471, 485, 83/471.2, 477; 144/136 R, 136 G, 136 H, 2 R, 218, 91, 133, 3 R, 134 R, 133 R

[56] References Cited
UNITED STATES PATENTS

| | | | |
|---|---|---|---|
| 1,813,293 | 7/1931 | Hrncsjar | 144/133 R |
| 2,602,476 | 8/1952 | Tibbets | 144/134 R |
| 2,610,389 | 9/1952 | Bungay | 83/471.2 X |
| 3,241,583 | 3/1966 | Andersen | 144/3 R |
| 3,251,388 | 5/1966 | Ennis | 144/3 R |
| 3,333,614 | 8/1967 | Furtado et al. | 144/134 R X |

*Primary Examiner*—Andrew R. Juhasz
*Assistant Examiner*—W. D. Bray
*Attorney, Agent, or Firm*—DeLio and Montgomery

[57] ABSTRACT

A woodworking machine for cutting a groove in a workpiece, comprising: a frame having a worktable with an opening therethrough, a vertically movable first support member in the frame, a saw assembly on the support member and vertically movable therewith, wherein the saw assembly includes a radial cutter head positioned for movement through the opening in the worktable so as to cut a vertical groove in the face of a workpiece on the worktable, means for actuating the cutter head, and elevator means for vertically moving the first support member and the saw assembly thereon.

6 Claims, 3 Drawing Figures

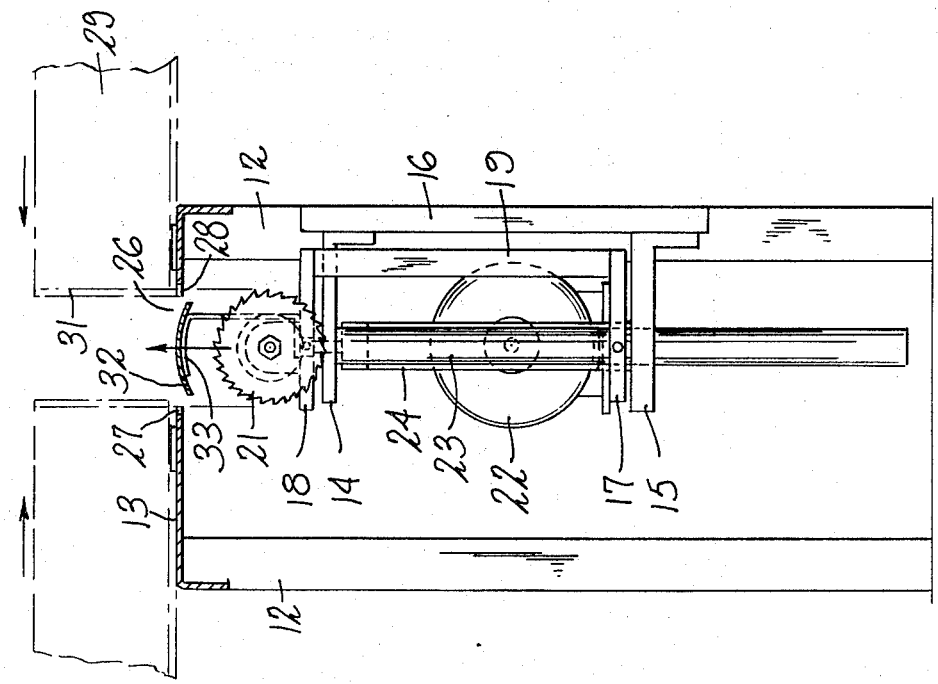
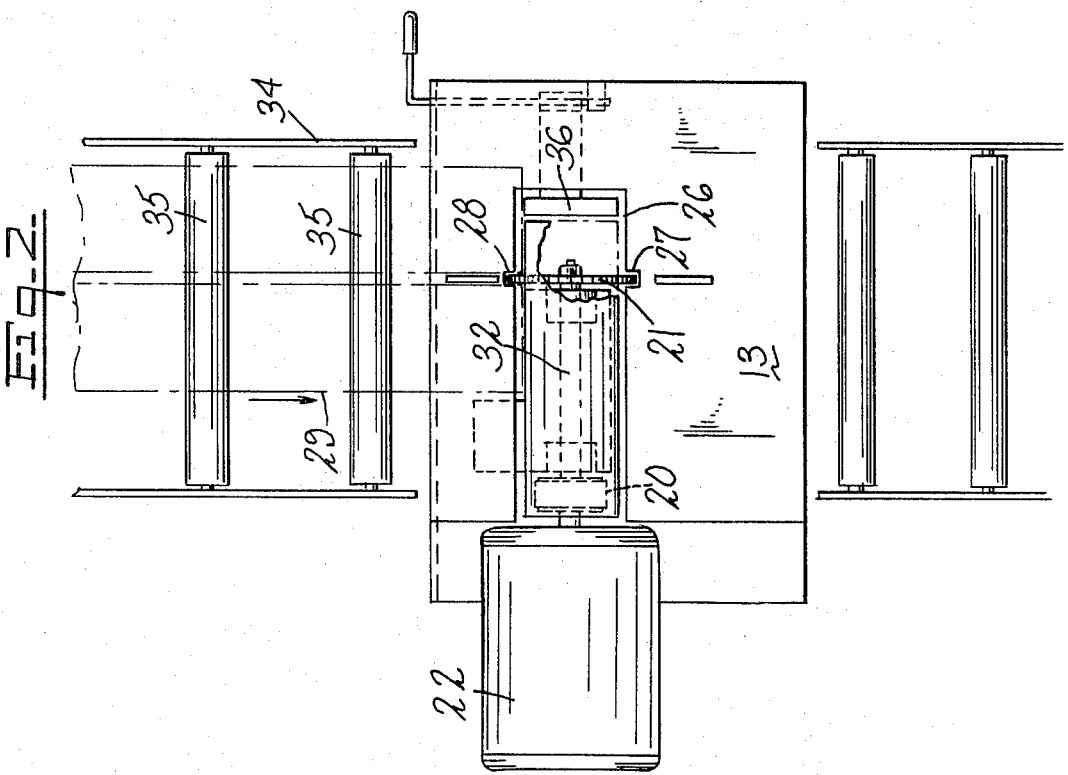

GROOVING MACHINE

BACKGROUND OF THE INVENTION

This invention relates to woodworking machines, and in particular to woodworking machines capable of efficient and precision cutting of a groove in an end face of a workpiece.

In the processing of structural members in the building construction industry, it is often required to cut a groove in a face of a beam or other workpiece. When a large number of workpieces must be so grooved for precision mating with other workpieces, hand-held radial saws and the like tend to be inefficient and hazardous. The hazard is especially great when the beams or other workpieces to be grooved are massive. For example, in the construction of buildings from whole logs, vertical grooves must be cut in the end faces of the logs to receive vertical planking or for mating with other structure such as splines. The splines are inserted in the grooves of adjacently positioned logs to form weather-tight joints between the logs. The operation of cutting the groove in the end faces of such logs is called "end grooving."

A need therefore exists for a woodworking machine capable of accurate, safe and efficient cutting of a groove in a workpiece, especially in the end face of workpieces of large dimensions such as the logs used in construction of log buildings.

OBJECTS AND SUMMARY

Accordingly, an object of the invention is to provide a new and improved woodworking machine for accurate and efficient cutting of a groove in a workpiece.

Another object is to provide a new and improved woodworking machine for the grooving of end faces of workpieces of large dimensions, such as logs, at greatly reduced hazard to the machine operator and other personnel.

These and other objects, features and advantages of the invention will be apparent from the specification which follows.

In brief outline, the machine comprises a frame having a worktable with an opening therethrough, a vertically movable first support member in the frame, a saw assembly on the support member which is vertically movable with the support member, the saw assembly including a radial cutter head positioned for movement through the opening so as to cut a vertical groove in the face of a workpiece on the worktable, means for actuating the cutter head, and elevator means for vertically moving the first support member with the saw assembly thereon. The elevator means may be mechanical, hydraulic, or pneumatic. The machine may be arranged for grooving an end face of a single workpiece or for simultaneous grooving of opposing faces of two such workpieces.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawing, in which:

FIG. 2 is a partially diagrammatic top plan view of a machine of the invention with associated apparatus, a portion of a machine being broken away to show underlying structure; and FIG. 3 is a vertical section along the line 3—3 of FIG. 1.

Figure 1:
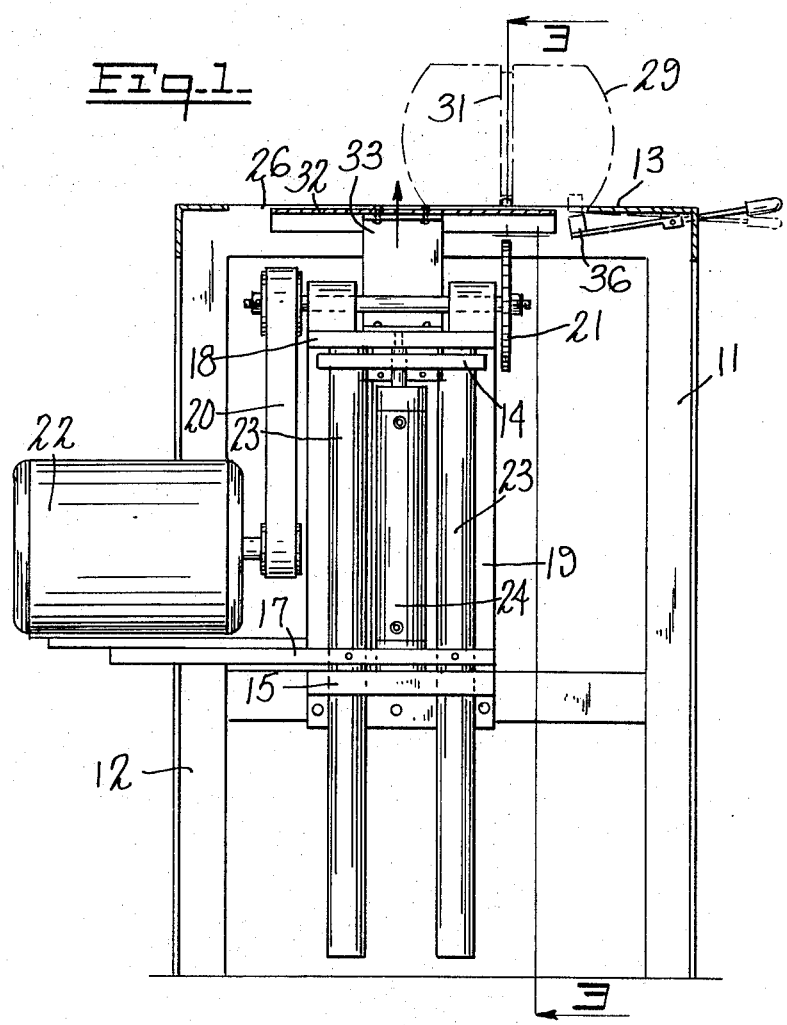
FIG. 1 is a vertical sectional view of a machine of the invention with diagrammatic illustration of a workpiece in position thereon for grooving.

With reference to FIG. 1, there is shown a frame which includes a worktable having four legs, two legs 11 and 12 being illustrated, and a horizontal work surface 13. As shown in FIGS. 1 and 3, a pair of horizontal guide members such as brackets 14 and 15 are fixedly mounted on a vertical panel 16 which is connected to the upper portion of one side of the frame. First and second support members such as platforms 17 and 18 are movably positioned within the frame below work surface 13 and are connected by a strut-like vertical member 19. Platform 18 supports a saw assembly which includes a radial cutter head 21.

As shown in FIGS. 1 and 3, the first platform 17 supports a means for actuating the cutter head, such as an electric motor 22. The two platforms 17 and 18 together with the cutter head 21 and electric motor 22 are vertically movable together by virtue of connection through the vertical member 19. A belt 20 transmits the drive from the electric motor 22 to the radial cutter head 21. It will be apparent that by suitable modification within the scope of the invention that the actuating means such as electric motor 22 may be mounted on the same platform 18 with the radial cutter head 21, with consequent elimination of lower platform 17, if desired.

As shown in FIGS. 1 and 3, a pair of slide rods 23 are journalled through guide brackets 14 and 15 as well as the lower platform 17. The upper ends of the guide rods 23 are affixed to the underside of platform 18. The lower ends of the guide rods may be supported on bracket 15 or on the surface upon which the worktable stands, if desired.

Means for elevating the platforms 17 and 18 is provided in any suitable fashion such as by an hydraulic cylinder 24 mounted on lower bracket 15 and journalled through lower platform 17. The piston of the hydraulic cylinder 24 is attached to the underside of platform 18, and thus the hydraulic cylinder 24 raises and lowers platforms 17 and 18 together with cutter head 21 and motor 22 thereon, in response to hydraulic pressure made operative through any suitable control means (not shown). In place of hydraulic elevator means, mechanical devices such as a jack or other levering device, or a pneumatic cylinder, may be used.

With reference to FIGS. 1-3, the worktable surface 13 has a rectangular slot or opening 26 therethrough as well as a pair of cutouts 27 and 28 on opposing edges of the opening 26 (as most clearly appears in FIG. 2). The opening and cutouts permit vertical movement of the platform 18 together with the cutter head 21 therethrough for contact of the cutter head with an end face of a workpiece such aa a log 29. Accordingly, upon elevation of cutter head 21 a vertical groove 31 is cut in the end face of log 29. A guard plate 32 is mounted on the platform 18 by a bracket 33. The guard plate preceeds the cutter head 21 through the opening 26, thus minimizing risk of injury to an operator.

Auxiliary to the woodworking machine are feed tables 34 having conveyor rollers 35. The feed tables are positioned on opposing sides of, and at the same level as, the work surface 13 to facilitate feeding of one or more logs 29 to the cutter head 21. The ends of the logs 29 are conveniently positioned on the work surface 13 for cutting of the grooves, by abutment against a vertically movable stop member 36. The stop member is suitably pivoted, as shown in FIGS. 1 and 2, for raising or lowering into the position required.

In operation, a single log 29 may be fed to the edge of the opening 26 over feed table 34 on the rollers 35, into abutment with stop member 36. As the radial saw cutter head 21 is rotated at the proper speed, the hydraulic cylinder 24 elevates platforms 17 and 18. The cutter head 21 is thus passed across the end face of log 29 to cut groove 31. Cutter head 21 is then lowered and log 29 is moved over the worktable surface 13 (from right to left in FIG. 2) for alignment of its other end over the opening 26 for cutting of a second, similar vertical groove 31 on the other end face of the log. Alternatively, end faces of two different logs may be grooved at the same time by placing the logs generally end to end on the worktable surface 13 and passing the cutter head 21 up through the opening 26. A second stop member (not shown) will of course be required for such second or alternate operations.

Accordingly, the machine provides a convenient and highly efficient way of cutting grooves on the end faces of workpieces. The fact that the machine may be made operative by remote control while requiring an operator to manipulate only the ends of the logs not being grooved, greatly reduces the danger of personal injury to the operator.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. In a woodworking machine for cutting a groove in a workpiece, the combination of:
    a frame having a worktable, said worktable having an opening therethrough;
    a vertically movable first support member in said frame;
    a saw assembly on said support member and vertically movable therewith, said assembly including a radial cutter head positioned for movement through said opening so as to cut a vertical groove in the face of workpiece on said worktable;
    means positioned below said cutter head for actuating said cutter head;
    elevator means for vertically moving said first support member with the saw assembly thereon; and
    abutment means on said worktable for positioning said workpiece thereon;
    a plate-like guard member connected to said first support member and positioned above said cutter head so as to precede said cutter head through said opening.

2. A machine as in claim 1, wherein said elevator means is hydraulic or pneumatic.

3. A machine as in claim 1, including a vertically movable second support member in said frame, and said actuating means includes an electric motor mounted on said second support member.

4. A machine as in claim 3, including a strut-like member connecting said second support member and the first support member of said machine, whereby said first and second support members are adapted for simultaneous vertical movement.

5. A machine as in claim 4, including a pair of horizontally extending guide members connected to the frame of said journalled below said worktable, and a pair of slide rods jornalled through said guide members and said second support member, the upper ends of said rods being connected to said first support member.

6. In a woodworking machine for cutting a groove in a workpiece, the combination of:
    a frame having a worktable, said worktable having an opening therethrough;
    a vertically movable first support member in said frame;
    a saw assembly on said support member and vertically movable therewith, said assembly including a radial cutter head positioned for movement through said opening so as to cut a vertical groove in the face of a workpiece on said worktable;
    means positioned below said cutter head for actuating said cutter head;
    hydraulic elevator means for vertically moving said first support member with the saw assembly thereon;
    a vertically movable second support member in said frame, said actuating means including an electric motor mounted on said second support member;
    a strut-like member connecting said first and second support members, whereby said first and second support members are adapted for simultaneous vertical movement; and
    abutment means on said worktable for positioning said workpiece thereon.

* * * * *

PO-1050
(5/69)

UNITED STATES PATENT OFFICE
CERTIFICATE OF CORRECTION

Patent No. 3,865,161     Dated February 11, 1975

Inventor(s) VITO M. VIZZIELLO ET AL

It is certified that error appears in the above-identified patent and that said Letters Patent are hereby corrected as shown below:

Column 4, line 25, "journalled" should read --machine--;

Signed and sealed this 10th day of June 1975.

(SEAL)
Attest:

RUTH C. MASON
Attesting Officer

C. MARSHALL DANN
Commissioner of Patents
and Trademarks